(144.)
ROBERT B. RUGGLES.
Improvement in Automatic Feeding Apparatus.
No. 122,914. Patented Jan. 23, 1872.
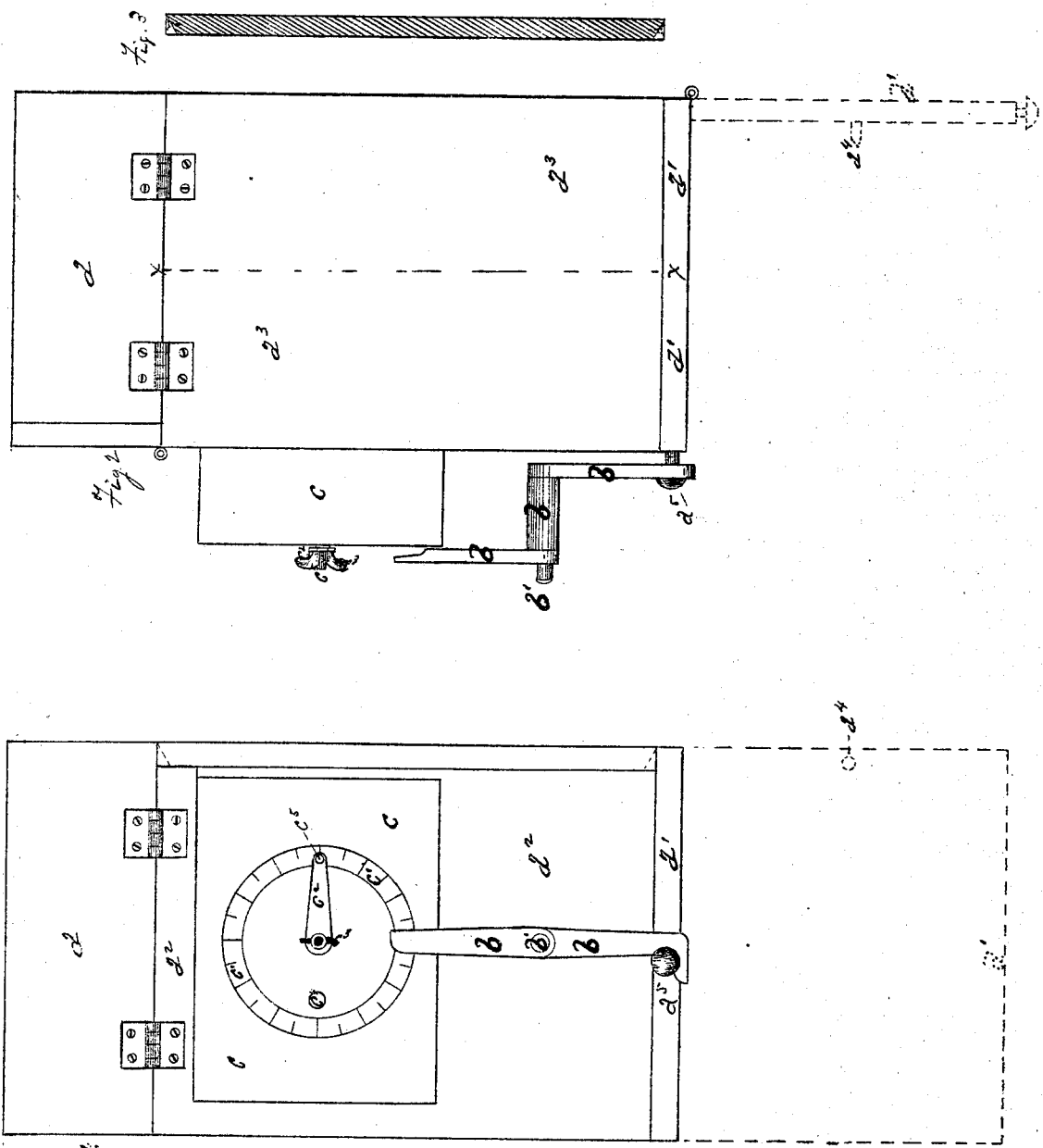

122,914

UNITED STATES PATENT OFFICE.

ROBERT B. RUGGLES, OF HARTFORD, CONNECTICUT.

IMPROVEMENT IN AUTOMATIC FEEDING APPARATUS.

Specification forming part of Letters Patent No. 122,914, dated January 23, 1872.

SPECIFICATION.

I, ROBERT B. RUGGLES, of Hartford, in the county of Hartford and State of Connecticut, have invented a certain new and useful Improved Automatic Feeding Apparatus for Horses and other Animals, of which the following is a specification, reference being had to the accompanying drawing, in which—

Figure 1 is a front elevation of the apparatus, and Fig. 2 is a view of the right side of the same. Fig. 3 is a central vertical view in section through the dotted line $x\ x$. (To be turned to the right in reading.)

The object and purpose of the invention are the production of an apparatus by the use of which it is practicable to feed a horse or other animal at any desired time in the day without the personal presence of the attendant. It consists of the box $a$, into which the food— oats, cut feed, hay, or the like—is placed, having its bottom, formed by the trap-door $a^1$, hinged at the bottom of the box, and swinging, when opened, into the position shown by the dotted lines in Figs. 1 and 2. It is held shut when desired by the trip-latch $b$, which is pivoted on the pin $b'$, its upper end extending onto the clock-face $c^1$, so as to be in the path of the clock-hand $c^2$. A common clock-movement is contained in the case $c$, having a center shaft for the hour-hand ($c^2$) only, which may be made fast or loose on the shaft by means of the thumb-screw $c^3$. There is a key-hole for winding the clock at $c^4$. The marks on the dial are for hours and half hours. This apparatus is placed over a feed-trough, so that when the trap-door $a^1$ opens the contents will fall into the trough ready to be eaten. When it is desired to use the apparatus the food is prepared and put into the box $a$, the clock is wound up, and the hand $c^2$ set back from the point where it strikes the trip-latch that number of hours that it is desired to have elapse before the feeding takes place, the hand being then made fast upon its shaft by means of the thumb-screw $c^3$.

At the proper time the pin $c^5$ in the end of the hand $c^2$ will strike against the trip-latch and release the trap-door from its hold, when the food will fall down into the feeding-trough. The main part of the front and right side of the box $a$—namely, the parts $a^2$ and $a^3$—are hung on hinges so as to give sidewise, and thus facilitate the fall of food placed therein, which, were it hay or the like, might catch against the sides of the box, and thereby be prevented from falling freely. The pin $a^4$ on the trap-door $a^1$ shuts up into a corresponding hole in the bottom of the flap $a^3$, and thus holds it in position when the whole is shut up. The trip-latch and the pin $a^5$ perform a like service for the flap $a^2$. Both the upper and the lower edges of the flaps $a^2$ and $a^3$ are beveled off inwardly, as shown by the section in Fig. 3, so that the food will not be liable to get into their joints when closed. This bevel extends quite across these edges, except a short space at the end, which is filled up squarely so as to leave no opening when the whole thing is shut up. The lower edges of the left side and the back have the same bevel.

I claim as my invention—

1. The pivoted trip-latch $b$, holding the trap-door $a^1$ closed, and tripped by the clock-hand $c^2$, substantially as described, and for the purpose set forth.

2. The food-reservoir $a$, having the hinged flaps $a^2$ and $a^3$ and the trap-door $a^1$ attached thereto, substantially in the manner and for the purposes set forth.

3. The hinged flaps $a^2$ and $a^3$ forming the sides of the food-reservoir and beveled upon their upper and lower edges, substantially as described, and for the purpose set forth.

Dated the 9th day of October, A. D. 1871.

R. B. RUGGLES.

Witnesses:
WM. E. SIMONDS,
HAWLEY KELLOGG.